United States Patent
Giles et al.

(10) Patent No.: US 12,467,430 B2
(45) Date of Patent: Nov. 11, 2025

(54) WIND TURBINE ROTOR BLADE PITCH CONTROL FOR TOWER FATIGUE REDUCTION

(71) Applicant: VESTAS WIND SYSTEMS A/S, Aarhus N (DK)

(72) Inventors: Alexander Duncan Giles, Oporto (PT); Jesper Sandberg Thomsen, Hadsten (DK); Christian Jeppesen, Horsens (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/720,107

(22) PCT Filed: Dec. 9, 2022

(86) PCT No.: PCT/DK2022/050273
§ 371 (c)(1),
(2) Date: Jun. 14, 2024

(87) PCT Pub. No.: WO2023/110040
PCT Pub. Date: Jun. 22, 2023

(65) Prior Publication Data
US 2025/0052229 A1    Feb. 13, 2025

(30) Foreign Application Priority Data
Dec. 14, 2021    (DK) .................. PA202170614

(51) Int. Cl.
*F03D 7/02*    (2006.01)
(52) U.S. Cl.
CPC ........ *F03D 7/0224* (2013.01); *F05B 2260/70* (2013.01); *F05B 2270/327* (2013.01); *F05B 2270/332* (2013.01)

(58) Field of Classification Search
CPC ............. F03D 7/0224; F03D 7/0296; F05B 2270/331; F05B 2270/334; F05B 2260/96; F05B 2260/962
See application file for complete search history.

(56) References Cited

U.S. PATENT DOCUMENTS

| | | | |
|---|---|---|---|
| 8,880,379 B2 * | 11/2014 | Miranda | F03D 7/046 |
| | | | 702/182 |
| 11,421,652 B2 * | 8/2022 | Thomsen | F03D 7/0224 |

(Continued)

FOREIGN PATENT DOCUMENTS

| | | | |
|---|---|---|---|
| CN | 101592127 A | * 12/2009 | ........... F03D 7/0224 |
| CN | 102926930 B | 7/2014 | |

(Continued)

OTHER PUBLICATIONS

Danish Patent and Trademark Office, 1st Technical Examination including The Search Report for Application PA 2021 70614 dated May 30, 2022.

(Continued)

*Primary Examiner* — Justin D Seabe
(74) *Attorney, Agent, or Firm* — Patterson + Sheridan, LLP; Gero G. McClellan (57) ABSTRACT

Adjusting pitch of the wind turbine rotor blades to reduce fatigue of the wind turbine tower. Flap loading sensor data is received for the rotor blades, and a flap loading vector in a rotor coordinate frame of the wind turbine is obtained. The flap loading vector is transformed to obtain first and second mutually orthogonal components in a fixed wind turbine coordinate frame, and respective 3P (blade passing frequency) components in the fixed frame indicative of 3P frequency content of the wind turbine tower are determined. A control action is applied to obtain respective 3P control components for mitigating the 3P frequency content of the tower, an inverse transform is applied to the 3P control (Continued)

components to obtain pitch reference offset values for the respective rotor blades in the rotor coordinate frame, and blade pitch is adjusted based on the pitch reference offset values.

20 Claims, 7 Drawing Sheets

(56) References Cited

U.S. PATENT DOCUMENTS

| | | |
|---|---|---|
| 2011/0158806 A1 | 6/2011 | Arms et al. |
| 2011/0229300 A1* | 9/2011 | Kanev .................. F03D 7/043 |
| | | 415/33 |
| 2017/0175709 A1 | 6/2017 | Daher Adegas et al. |
| 2020/0158084 A1* | 5/2020 | Caponetti ............... F03D 9/25 |

FOREIGN PATENT DOCUMENTS

| | | |
|---|---|---|
| CN | 106014857 B | 11/2019 |
| KR | 20160066264 A | 6/2016 |
| WO | 2019042515 A1 | 3/2019 |
| WO | 2020239177 A1 | 12/2020 |
| WO | 2021223823 A1 | 11/2021 |

OTHER PUBLICATIONS

PCT International Search Report and Written Opinion of The International Searching Authority for Application PCT/DK2022/050273 dated Mar. 30, 2023 (Mar. 30, 2023).

* cited by examiner

WIND TURBINE ROTOR BLADE PITCH CONTROL FOR TOWER FATIGUE REDUCTION

FIELD OF THE INVENTION

The invention relates to controlling the pitch of rotor blades of a wind turbine and, in particular, to controlling rotor blade pitch to reduce fatigue of a tower of the wind turbine.

BACKGROUND OF THE INVENTION

Wind turbines as known in the art include a wind turbine tower supporting a nacelle and a rotor with a number of (typically, three) pitch-adjustable rotor blades mounted thereto. A wind turbine is prone to vibrations, such as tower, nacelle, or rotor blade movement. It is known that certain types of vibrations may be damped by active pitching of the rotor blades or adjusting generator torque. Control strategies for adjusting blade pitch can be used to maximise energy production of a wind turbine while minimising loads experienced by various components of the wind turbine.

As the rotor of a wind turbine rotates, the wind turbine tower may oscillate or vibrate in one or more directions, e.g. side-to-side or fore-aft. The tower may have various modes of natural vibration frequencies. One such mode is a first mode that corresponds to the side-to-side vibrational frequency of the tower. In the case of a floating wind turbine system, e.g. an offshore system, then a natural vibration frequency may be a coupled mode between the tower and a platform on which the wind turbine floats.

The rotational frequency of the rotor—i.e. the frequency with which a complete rotation of the rotor is completed—may be referred to as a 1P frequency. The frequency at which a rotor blade passes the tower for a wind turbine with three blades may be referred to as 3P, which may then result in 3P frequency content in the tower.

In certain wind turbine control schemes, e.g. to maximise energy production, it may be necessary to operate the wind turbine at a rotor speed that results in the 3P frequency coinciding with a natural frequency such as a tower first mode or a coupled mode. This coincidence of frequencies can cause excitations of the tower, resulting in tower fatigue. In certain systems, this can be the case when the rotor approaches its nominal speed. As a wind turbine rotor may be operated at nominal speed for significant periods of wind turbine operation, e.g. in a full-load region above a rated wind speed, then a margin between the 3P frequency and a natural mode may be relatively small for significant periods of wind turbine operation, meaning that the tower may accrue significant fatigue through prolonged excitations local to a natural mode.

It is against this background to which the present invention is set.

SUMMARY OF THE INVENTION

According to an aspect of the invention there is provided a controller for a wind turbine having a plurality of rotor blades, e.g. three rotor blades. The controller is for adjusting pitch of the rotor blades. The controller is configured to receive sensor data, from a flap loading sensor of each of the three rotor blades, indicative of flap loading on each of the respective rotor blades. The controller is configured to obtain, based on the received sensor data, a flap loading vector in a rotor coordinate frame of the wind turbine. The controller is configured to apply an m-blade coordinate transformation to the flap loading vector to obtain first and second components in a fixed coordinate frame of the wind turbine, where the first and second components are mutually orthogonal. The controller is configured to determine first and second 3P components in the fixed coordinate frame based on the obtained first and second components, the first and second 3P components being indicative of 3P frequency content of a tower of the wind turbine. The controller is configured to apply a control action to the first and second 3P components to obtain respective first and second 3P control components for mitigating the 3P frequency content of the tower. The controller is configured to apply an inverse m-blade coordinate transformation to the first and second 3P control components to obtain pitch reference offset values for the respective rotor blades in the rotor coordinate frame. The controller is configured to transmit a control signal to adjust pitch of the rotor blades based on the obtained pitch reference offset values.

The controller may be configured to determine the 3P frequency based on the received sensor data. The controller may be configured to determine or receive a natural frequency of the tower.

Transmission of the control signal to adjust pitch of the rotor blades may be dependent on a comparison of the 3P frequency to the natural frequency.

Transmission of the control signal to adjust pitch of the rotor blades may be activated if a ratio between the 3P frequency and the natural frequency is within a prescribed range. Optionally, transmission of the control signal may be deactivated if the ratio is not within the prescribed range.

Applying the control action may comprise application of a gain-scheduled control module to the first and second 3P components.

An activation gain for the control action may be determined based on a comparison of the 3P frequency to the natural frequency. That is the gain-scheduled control module may implement an activation gain to be applied.

The activation gain may be greater than zero if a ratio between the 3P frequency and the natural frequency is within a prescribed range. Optionally, the prescribed range may include a ratio equal to 1. Further optionally, the activation gain may be zero if the ratio is not within the prescribed range.

The activation gain may be a constant value if the ratio between the 3P frequency and the natural frequency is within a prescribed sub-range of the prescribed range. The activation gain may reduce from the constant value to zero from an extreme value of the prescribed sub-range to an extreme value of the prescribed range. Optionally, the reduction may be a linear reduction.

The controller may be configured to obtain acceleration data indicative of an acceleration of the tower of the wind turbine. The controller may be configured to estimate an amplitude of tower accelerations based on the obtained acceleration data. The activation gain may be determined based on the estimated amplitude of tower accelerations.

The controller may be configured to obtain a current rotor speed (or generator speed) of the wind turbine. The gain-scheduled control module may ensure that a maximum allowable pitch reference offset amplitude is applied to the control action. By setting a maximum allowable pitch reference offset amplitude it may be ensured that the control action does not exceed a capacity of the hydraulic pumps used for the pitch actuation. The maximum allowable pitch reference offset amplitude of the gain-scheduled control module may be determined based on a comparison of the current rotor speed to a nominal rotor speed of the wind turbine (or a comparison of the current generator speed to a nominal generator speed of the wind turbine).

The allowable pitch reference offset amplitude may be greater for lower values of a ratio between the current rotor speed and the nominal rotor speed. Optionally, the allowable pitch reference offset amplitude is a first pitch reference offset amplitude when the ratio is greater than a prescribed value. Optionally, the allowable pitch reference offset amplitude is a second pitch reference offset amplitude greater than the first pitch reference offset amplitude when the ratio is less than the prescribed value.

The allowable pitch reference offset amplitude may be indicative of a pitch rate at which pitch of the rotor blades is adjusted. Alternatively, or in addition, the allowable pitch reference offset amplitude may be indicative of an amplitude limit to which pitch of the rotor blades is adjustable.

Determining the first and second 3P components may comprise applying a transform to the first and second components based on a phase that moves at the 3P frequency.

Obtaining the flap loading vector may comprise applying a first filter to the received sensor data to remove content in the received sensor data indicative of an imbalance in a rotor of the wind turbine.

The controller may be configured to apply a second filter to remove content in the first and second components indicative of a steady-state contribution in a tilt or yaw direction of the wind turbine. The controller may be configured to apply the second filter prior to determining the first and second 3P components.

The m-blade coordinate transformation may be a Coleman transformation. The inverse m-blade coordinate transformation may be an inverse Coleman transformation. The m-blade transformation is also referred to in the art as a multi-blade transformation. In an embodiment the m-blade coordinate transformation is a Coleman transformation. However, other transformations may also fall into the category of m-blade coordinate transformations, hereunder so-called d-q transformation and Park transformation or similar transformations. It is within the abilities of the skilled person to determine an alternative transformation which may not strictly be a Coleman transformation, but which operates in an equivalent manner.

According to another aspect of the invention there is provided a wind turbine comprising a controller as defined above.

According to another aspect of the invention there is provided a method for adjusting rotor blade pitch of a wind turbine. The method comprises receiving sensor data, from a flap loading sensor of each of three rotor blades of the wind turbine, indicative of flap loading on each of the respective rotor blades. The method comprises obtaining, based on the received sensor data, a flap loading vector in a rotor coordinate frame of the wind turbine. The method comprises applying an m-blade coordinate transformation to the flap loading vector to obtain first and second mutually orthogonal components in a fixed coordinate frame of the wind turbine. The method comprises determining first and second 3P components in the fixed coordinate frame based on the obtained first and second components, the first and second 3P components being indicative of 3P frequency content of a tower of the wind turbine. The method comprises applying a control action to the first and second 3P components to obtain respective first and second 3P control components for mitigating the 3P frequency content of the tower. The method comprises applying an inverse m-blade coordinate transformation to the first and second 3P control components to obtain pitch reference offset values for the respective rotor blades in the rotor coordinate frame. The method comprises transmitting a control signal to adjust pitch of the rotor blades based on the obtained pitch reference offset values.

According to another aspect of the invention there is provided a non-transitory, computer-readable storage medium storing instructions thereon that when executed by one or more processors cause the one or more processors to execute the method defined above.

BRIEF DESCRIPTION OF THE DRAWINGS

Examples of the invention will now be described with reference to the accompanying drawings, in which.

DETAILED DESCRIPTION OF EMBODIMENTS

Figure 1:
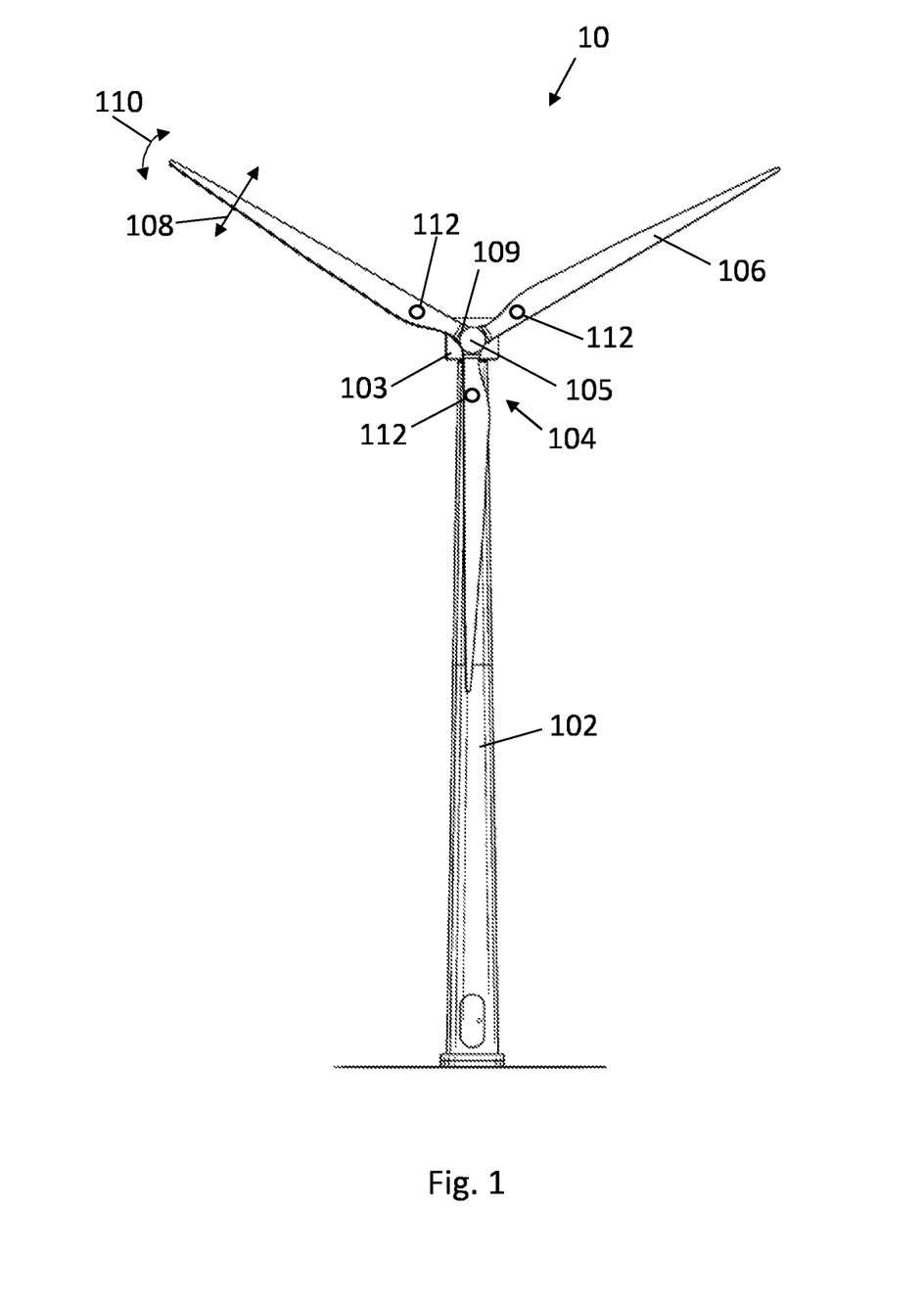
FIG. 1 schematically illustrates a wind turbine in accordance with an aspect of the invention, the wind turbine including a tower.

FIG. 1 illustrates, in a schematic view, an example of a wind turbine 10. The wind turbine 10 includes a tower 102, a nacelle 103 disposed at the apex of, or atop, the tower 102, and a rotor 104 operatively coupled to a generator housed inside the nacelle 103. In addition to the generator, the nacelle 103 houses other components required for converting wind energy into electrical energy and various components needed to operate, control, and optimise the performance of the wind turbine 10. The rotor 104 of the wind turbine 10 includes a central hub 105 and three rotor blades 106 that project outwardly from the central hub 105. Moreover, the wind turbine 10 comprises a control system or controller (not shown in FIG. 1). The controller may be placed inside the nacelle 103, in the tower 102 or distributed at a number of locations inside (or externally to) the turbine 10 and communicatively connected to one another. The rotor blades 106 are pitch-adjustable. The rotor blades 106 can be adjusted in accordance with a collective pitch setting, where each of the blades are set to the same pitch value. In addition, the rotor blades 106 are adjustable in accordance with individual pitch settings, where each blade 106 may be provided with an individual pitch setpoint.

In some examples, the wind turbine 10 includes blade load sensors placed at, or in the vicinity of, each blade root 109 in a manner such that the sensor detects loading in the blade 106. Blade load signals from such sensors may be used to determine how to adjust the pitch of each of the individual blades 106. Depending on the placement and the type of sensor, loading may be detected in the flap (flapwise) direction 110 (in/out of plane) or in the edge (edgewise) direction 108 (in-plane). Such sensors may be strain gauge sensors or optical Bragg-sensors, for instance. As the sensors are placed on the rotating blades 106, such load signals for each of the adjustable rotor blades 106 are measured in the rotating reference frame of the rotor 104.

Shown within each blade 106 is a blade load sensor 112. In different examples, more than one blade load sensor may be provided in each blade. The blade load sensors 112 are arranged to measure flap loading on the blades 106. The blade load sensors 112 are shown to be placed in the blades towards the root end. In embodiments, the blade load sensors are placed in the actual root section.

Figure 2:
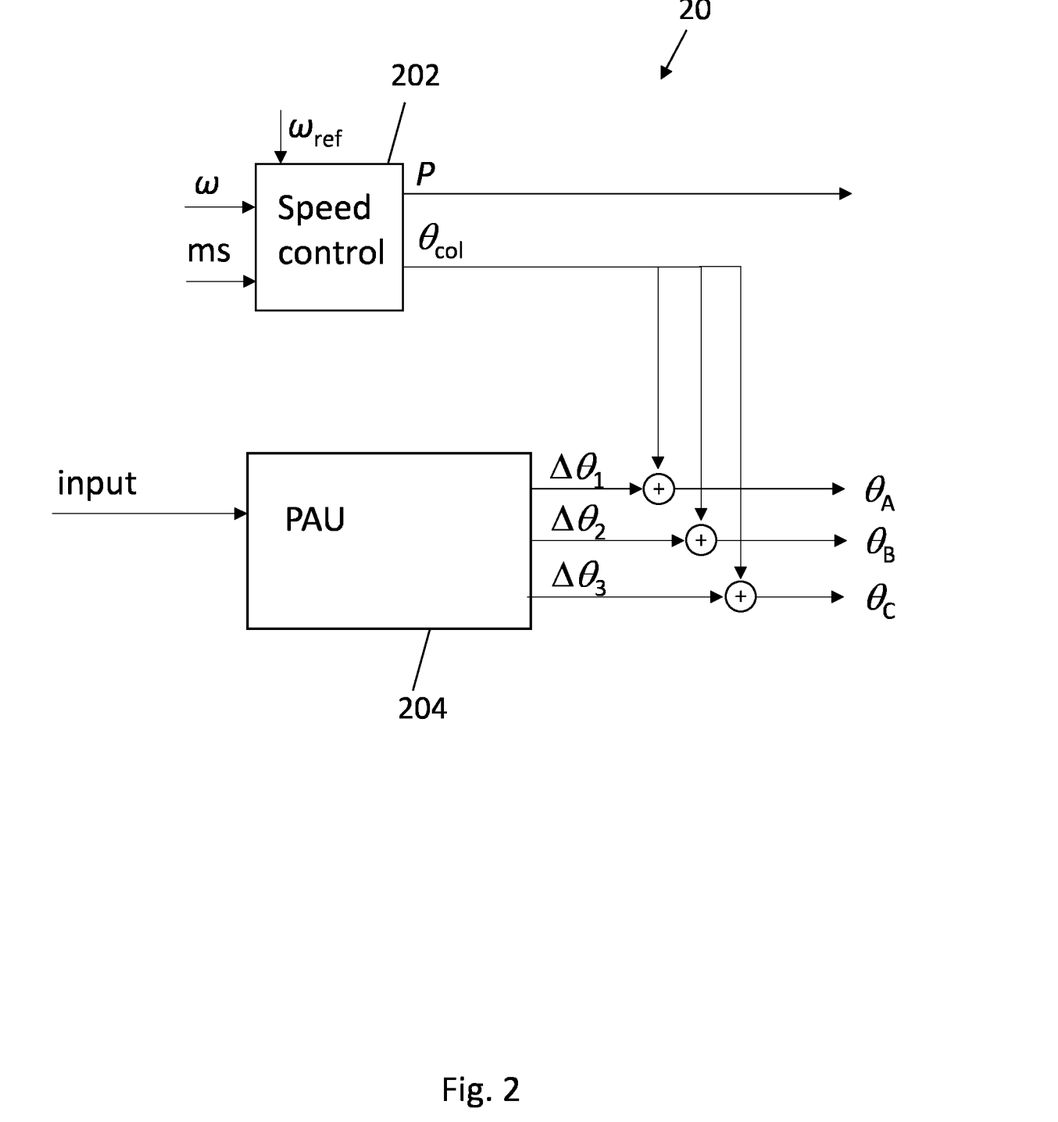
FIG. 2 schematically illustrates a controller of the wind turbine of FIG. 1 in accordance with an aspect of the invention.

FIG. 2 schematically illustrates an example of an overall controller 20 (of the wind turbine 10) that includes a feedback speed controller or control block 202 implemented to determine individual pitch actuation signals capable of reducing blade loads experienced by the rotor blades 106. In the illustrated implementation, the speed controller 202 minimises a speed error ($\omega - \omega_{ref}$) between the actual rotor speed, $\omega$, and a reference rotor speed, $\omega_{ref}$, in order to output a requested power P (in the form of a power setpoint) and a collective pitch reference, $\theta_{col}$. The collective pitch reference as determined by the speed controller 202, in view of the rotor speed, may also take further sensor values into account. This is referred to in FIG. 2 as a measurement set, ms, being input into the speed controller 202. The feedback speed controller 202 may be implemented by a PI (proportional-integral), PID (proportional-integral-derivative), or similar control scheme. In one example, the speed controller 202 may alternatively be a model predictive controller which, based on minimising a cost function, is arranged to determine the collective pitch reference and/or the power reference.

FIG. 2 further illustrates a control block or controller 204, of the overall controller 20, which may be referred to as a pitch actuation unit (PAU). In the pitch actuation unit 204, pitch modification signals ($\Delta\theta_1$, $\Delta\theta_2$, $\Delta\theta_3$) are being determined based on one or more input signals. In some examples, the input signals include blade load signals from load sensors 112 in the blades 106.

The PAU 204 determines pitch modification signals, or pitch reference offset values, ($\Delta\theta_1$, $\Delta\theta_2$, $\Delta\theta_3$) for each rotor blade 106. These offsets are superimposed onto the collective pitch reference to provide resulting or overall pitch modification signals ($\theta_A$, $\theta_B$, $\theta_C$) that can be applied to the pitch actuators of the rotor blades 106 individually.

In the example shown in FIG. 2, a collective pitch reference for the pitch-adjustable rotor blades 106 is being determined based on a rotor speed, and a resulting pitch modification signal is applied to the pitch-adjustable rotor blades 106. The resulting pitch modification signal is applied to the pitch-adjustable rotor blades 106 individually, and for each individual blade 106 is based on a signal of the collective pitch reference and the respective individual pitch modification signal. In one example, the individual pitch modification signal is being applied in a cyclic manner. Thus, pitch actuation signals are determined for each pitch adjustable rotor blade 106 based on the pitch modification signal for each rotor blade 106.

The described controller 20 may be in the form of any suitable computing device, for instance one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the methods performed by the controller, and the processor(s) may execute the stored instructions to perform the method.

The present invention is directed to reducing levels of fatigue in the wind turbine tower 102. In particular, the invention is directed to reducing tower fatigue that arises as a result of 3P frequency content in the tower, i.e. vibrations caused by the blade passing frequency of the wind turbine (the frequency with which a blade passes the tower in a three-blade wind turbine during operation). Specifically, the invention is aimed at reducing tower fatigue resulting from excitations that occur when the 3P frequency coincides with, or is in relatively close proximity to, a natural frequency mode, e.g. the tower first mode, or a coupling mode between the wind turbine tower and a platform in the case of a floating wind turbine system.

The present invention provides for controlling pitch of the wind turbine rotor blads to reduce tower fatigue resulting from 3P frequency content. In particular, the present invention advantageously utilises the fact that cyclic disturbances in a rotational coordinate plane describing rotor and blade rotation of the wind turbine appear in a fixed coordinate plane describing tower movement of the wind turbine. Specifically, the invention utilises the fact that 2P cyclic disturbances in a rotational frame appear at 3P in a fixed frame. In this way, pitch adjustment of the blades to reduce 2P cyclic disturbances can be used to reduce 3P tower vibrations, and therefore reduce tower fatigue.

In the described example, the PAU 204 of FIG. 2 is used to determine the pitch adjustment values, or pitch reference offset values, $\Delta\theta_1$, $\Delta\theta_2$, $\Delta\theta_3$ for each rotor blade 106 to reduce tower fatigue caused by 3P frequency content. The PAU 204 takes as input signals from the blade load sensors 112.

Figure 3:
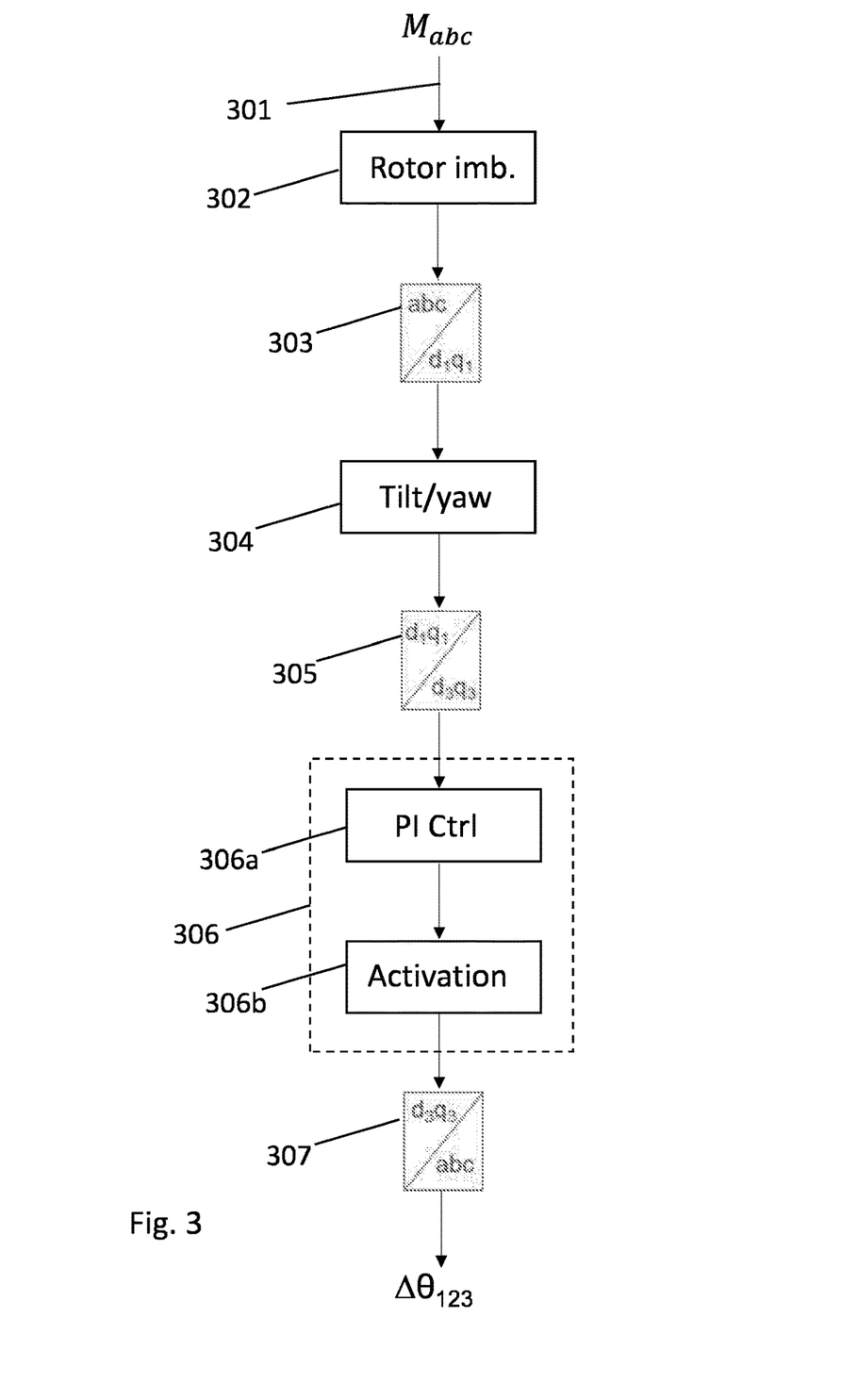
FIG. 3 schematically illustrates modules or components of the controller of FIG. 2.

FIG. 3 schematically illustrates functional or processing blocks/modules/units of the PAU 204. The input signal 301 is sensor data from the blade load sensors 112. In the described example, the blade load sensors 112 are flap load sensors that indicate loading on the respective blade 106 in the flapwise direction. As mentioned above, in the described example each blade 106 has a flap load sensor 112. The PAU 204 may receive data from each of the sensors 112. The flap load sensor signals are referred to in the figure as $M_{abc}$, where the suffix abc refers to the three blades, i.e. blade a, etc.

The sensor data received from the flap load sensors 112 is used to obtain a three-dimensional vector, where each value of the vector indicates a flap bending moment associated with a respective one of the three blades 112. The flapwise load signals are measured in a rotating or rotor reference frame. The rotating reference frame may be in a rotor rotational plane of the wind turbine 10, and may be centred at the rotor 104, for instance.

The flapwise load signals may be coordinate transformed by an m-blade (multi-blade) coordinate transformation. The transformation takes the three rotating signals into a fixed reference frame along a first reference direction d and a second reference direction q. The transformation makes it possible to identify 3P frequency content in the tower 102 from the cyclic disturbances in the blade flapwise load signals.

The m-blade coordinate transformation may be in the form of a Coleman transformation. The Coleman transformation may be defined as follows:

$$\begin{bmatrix} M_d \\ M_q \end{bmatrix} = \begin{bmatrix} \cos(\psi) & \cos(\psi + 2\pi/3) & \cos(\psi - 2\pi/3) \\ \sin(\psi) & \sin(\psi + 2\pi/3) & \sin(\psi - 2\pi/3) \end{bmatrix} \begin{bmatrix} M_a \\ M_b \\ M_c \end{bmatrix}$$

where $M_{abc}$ is the bending moment vector (in the rotor coordinate frame), which in the described example is in the flap direction (but in different examples could be in the edge direction), $\psi$ is the (1P) phase, and $M_{dq}$ is a vector in the fixed coordinate frame. When $M_{abc}$ is the vector containing the out-of-plane blade root bending moments and the phase is set as the rotor azimuth, the directions d, q are tilt and yaw directions; however, in general, the Coleman transformation simply transforms the rotating signals into mutually orthogonal first and second components in the fixed reference frame. In addition to indicating tilt and yaw loads, the fixed coordinate frame can be used to capture information relating to excitation of the tower 102.

Returning to FIG. 3, the blade flap bending moments $M_a$, $M_b$, $M_c$ may be pre-processed or filtered prior to undergoing the coordinate transformation to remove signal content that is not needed for the present purpose. In particular, the functional block 302 may remove frequency content in the input signal 301 related to imbalances in the rotor 104. The block 302 may be a high-pass filter tuned to not introduce any gain or phase distortion at 2P in the rotating frame. This high-pass filter may be applied in equal measure to all three of the blade load signals.

The functional unit 303 then applies the m-blade transformation to the (possibly pre-filtered) flap bending moment vector $M_{abc}$ to obtain the vector $M_{dq}$ including the first and second components $M_d$, $M_q$, as described above. As a result of this transformation, 1P content (i.e. rotor rotational frequency content) in the input signal appears at 0P in the transformed signal. Also, 3P content in the input signal corresponds to the collective flap load, and this disappears in the transformed signal. On the other hand, 2P and 4P content in the input signal (in the rotor frame) appears at 3P in the transformed signal (in the fixed frame); 5P and 7P content in the input signal (in the rotor frame) appears at 6P in the transformed signal (in the fixed frame). In particular, a 2P disturbance in the flap direction of the rotor ABC frame (rotational coordinate frame) generates an excitation in the tower 102 at 3P.

As the described example is aimed at targeting 3P content, then the first and second components obtained from the m-blade transformation may be input to the functional unit 304 of the PAU 204, which is for removing content in the transformed signal (in the fixed reference frame) related to steady-state tilt and yaw contributions. The unit or block 304 may be a high-pass filter tuned such that it does not introduce any phase or gain distortion at 3P (in the fixed frame). This high-pass filter may be applied in equal measure to both of the orthogonal signals.

At the functional unit 305, a further transform may be applied to first and second components. As the focus in the present approach is on 3P frequency content, then the transformation may be based on a phase of the 3P content. In one example, the following transformation is applied:

$$\begin{bmatrix} M_{d,3P} \\ M_{q,3P} \end{bmatrix} = \begin{bmatrix} \cos \psi_{3P} & \sin \psi_{3P} \\ -\sin \psi_{3P} & \cos \psi_{3P} \end{bmatrix} \begin{bmatrix} M_d \\ M_q \end{bmatrix}$$

where $\psi_{3P}$ is the 3P phase, and $M_{d,3P}$, $M_{d,3P}$ are first and second 3P components. In the figure $M_d$, $M_q$ is marked as $d_1q_1$, and $M_{d,3P}$, $M_{d,3P}$ are marked as $d_3q_3$.

In this frame of reference, the 4P content in the original input signal (in the rotor frame) now appears at 6P, and so can be removed by application of a low-pass filter. This low-pass filter may be applied in equal measure to both of the orthogonal signals.

Once the contribution of the 2P content (in the rotor frame) to 3P frequency content in the fixed frame has been isolated in this manner, then a control action for counteracting it, or mitigating its effect, is determined as part of a general control action module 306. Application of the control action may include application of a gain-scheduled control module or control unit as part of the module 306. As illustrated in FIG. 3, the module 306 may include a PI (proportional integral) controller 306a to be applied to the respective 3P components.

The control scheme of the described example is gain-scheduled as a different system response is desired and appropriate for different operating points of the wind turbine 10. As outlined above, 2P cyclic disturbances in the rotor (abc) coordinate frame generate excitations in the tower 102 at 3P in the fixed frame. The response of the tower 102 can become large if the 3P frequency is approximately equal to a natural frequency, such as a tower first mode or coupled mode. On the other hand, if there is a sufficient margin between the 3P and natural frequencies, then the tower excitation response may be relatively small. As such, the efficacy of performing control actions (i.e. blade pitch adjustment) to reduce flap load content at 2P may be relatively low. Given that there is fatigue accrued by the blade bearing in order to adjust blade pitch, then taking action to reduce flap load content at 2P may be economic only when the 3P frequency is approximately equal to a natural frequency in the fixed coordinate frame, in the sense of achieving an overall reduction in wind turbine component fatigue.

As such, an activation strategy module 306b of the controller 204 may be implemented to determine an activation gain for any mitigation control action to be taken, where the activation gain is determined based on the level of excitation generated in the wind turbine tower 102 as a result of 3P frequency content. In particular, the 3P frequency of the tower 102 is compared to an obtained natural frequency of the tower 102, e.g. a tower first frequency mode. An activation gain of the control signal is then determined based on this comparison. The natural frequency may for instance be a defined parameter of the wind turbine 10 that is hard-coded into the controller 20.

In one example, the activation gain may be determined based on a difference between the 3P and natural frequencies. For instance, if the difference is below a prescribed threshold value—indicating that the 3P and natural frequencies approximately coincide—then the activation gain may be set such that the control action to reduce tower 3P fatigue is 'activated'. This may involve setting an activation gain to a certain value, e.g. one. On the other hand, if the difference between the 3P and natural frequencies is above the threshold value, then the activation gain may be set such that a control action to reduce tower 3P fatigue is 'deactivated' (i.e. it is determined that tower 3P fatigue reduction is uneconomic or not needed). This may involve setting the activation gain to zero, for instance.

In another example, the activation gain may be determined based on a ratio between the 3P and natural frequencies. For instance, if the ratio is sufficiently close to one— indicating that the 3P and natural frequencies are approximately equal—then the activation gain may be set such that the control action to reduce tower 3P fatigue is activated.

After the functional unit 306 and before the functional unit 307, a functional unit arranged for adjusting the signal phase may be arranged. The PI controller 306a may alter the phase leading to non-linear lags in the system, and such lags may advantageously be compensated. The phase adjustment may be based on the operating point, e.g. by using a look-up table.

Figure 4:
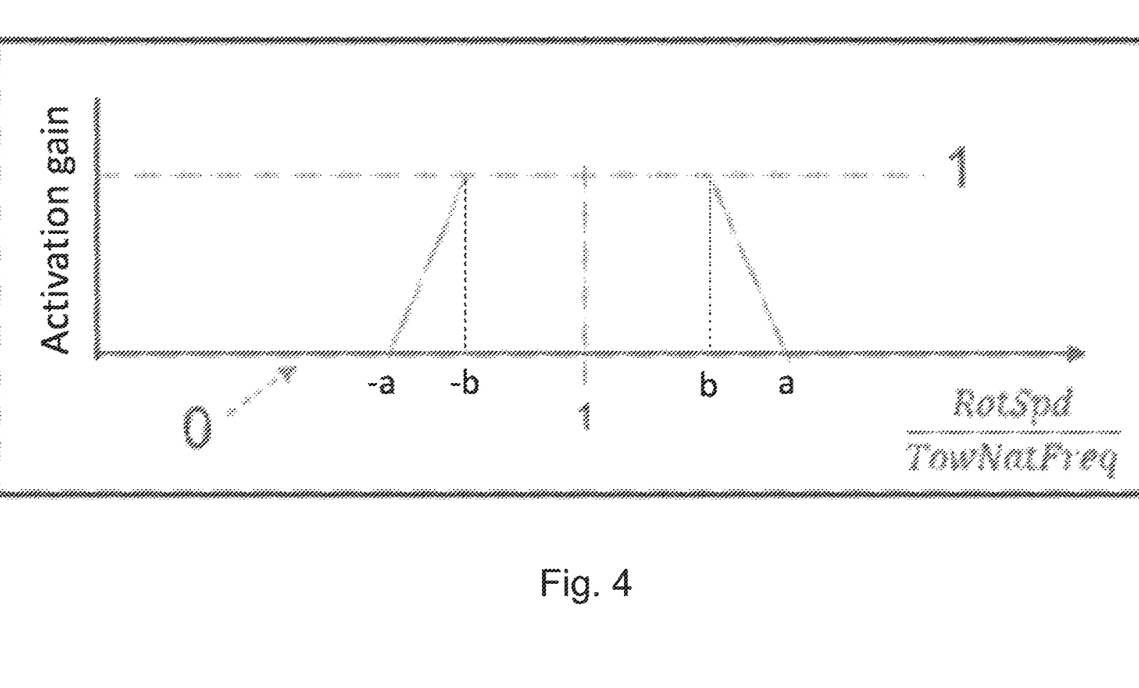
FIG. 4 shows a plot illustrating how an activation gain of the controller of FIG. 2 varies as a function of a ratio between a 3P frequency and a natural frequency of the tower of FIG. 1.

FIG. 4 shows a plot that schematically illustrates how an activation gain may be determined based on a ratio between 3P and natural frequencies. The activation gain may also be regarded as an amplitude being applied to a control action for mitigating or reducing 3P frequency content in the tower 102. As illustrated in the example of FIG. 4, if the ratio between the 3P and natural frequencies is sufficiently close to one, then the activation gain is set to one (i.e. the maximum). FIG. 4 also illustrates that, in the described example, as the ratio moves further away from one, the activation is ramped downwards until the activation gain becomes zero (i.e. the tower 3P reduction is deactivated) for values of the ratio distant from one (i.e. when the 3P and natural frequencies are sufficiently different from one another).

In FIG. 4, a range [−a, a] of ratio values may be defined in which the activation gain is non-zero, where the range [−a, a] includes a ratio value of one. Values of the ratio outside of the range [−a, a] may then result in an activation gain of zero. A sub-range [−b, b] within the range [−a, a] may also be defined, where the sub-range [−b, b] also includes the ratio value of one. The activation gain may be set to a constant value, e.g. one, for values of the ratio in the sub-range [−b, b]. Values of the ratio outside of the sub-range [−b, b] but inside the range [−a, a] may then be set to a value less than the constant value in the sub-range (e.g. less than one), but greater than zero. As illustrated in FIG. 4, the activation gain may vary linearly with the ratio value in this range. Purely as an illustrative example, the values a and b may be 0.8 and 0.85, respectively; however, it will be understood that these values may be tuned to any suitable values.

In some examples, the activation gain may be further modified from the value determined as outlined above. In particular, one or more further considerations may be taken into account when setting the gain value for the present control scheme, i.e. when determining to what extent the present control scheme seeks to dampen tower 3P frequency content. This further refinement may be performed with the aim of limiting fatigue of the blade bearings. For instance, the energy in the tower 102 at 3P may be taken into consideration for this purpose.

Figure 5:
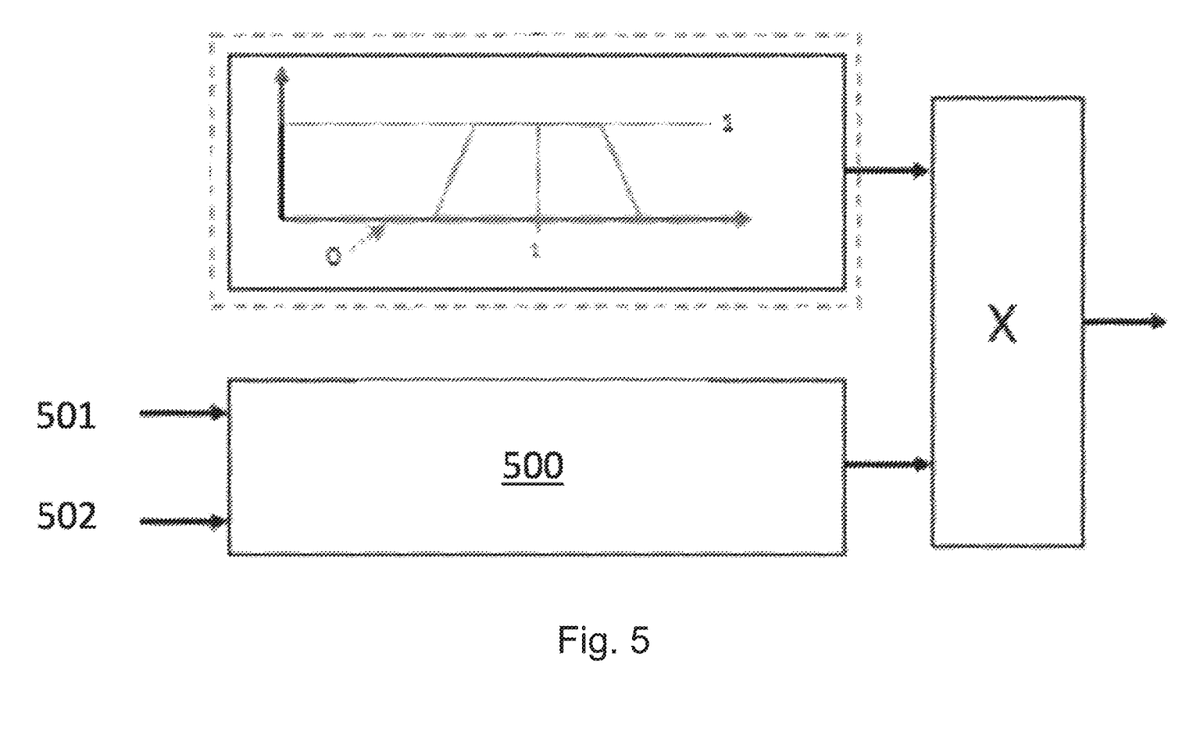
FIG. 5 illustrates a module of the controller of FIG. 2 for modifying the activation gain of FIG. 4.

As illustrated in FIG. 5, in one example the activation gain as described in connection with FIG. 4, is modified (in the control block 306) by multiplying it by a secondary activation element 500 that assesses the 3P content in the tower acceleration signal 102. In particular, acceleration signals may be received relating to the acceleration of the tower 102, e.g. side-to-side 501 and/or fore-aft 502 tower acceleration. These acceleration signals may be received from one or more accelerometers located in the tower 102 or nacelle 103 of the wind turbine 10. An estimation of the 3P content in the tower 102 may then be determined using a defined wind turbine tower model based on the acceleration signals. A gain value 503 based on this 3P content estimation may then be determined. For instance, the determined gain may be higher for higher values of the estimated 3P content. This content-dependent gain 503 may then be combined with (multiplied by) the activation gain to obtain the modified activation gain used for applying the control scheme to reduce tower 3P fatigue.

Returning to FIG. 3, a maximum pitch reference offset amplitude may be set and be variable for different operating points of the wind turbine 10. In particular, different rotor or generator speeds of the wind turbine 10 can influence the demand on a pitch adjustment system, in particular effecting pump capacity of the hydraulic pump. At lower rotor speeds, the pitch system is used to adjust blade pitch less frequently than when the wind turbine 10 is being operated at nominal speed. From the perspective of pump capacity of the pitch system, therefore, extreme values (maximum or minimum values) of the allowable pitch amplitude may be increased at lower rotor speeds with having significant effect on the pitch system, as may a rate at which the blade pitch is adjusted. Indeed, such an increase may beneficially assist with lubrication of the pitch system, which is used less frequently at lower speeds.

The allowable maximum pitch reference offset may be set on the $M_{d,3P}$, $M_{d,3P}/d_3q_3$ components after application of the activation gain by imposing a saturation on the components so that the resulting pitch reference offset values after the inverse coordinate transformation are limited by the allowable maximum level.

In view of the above, constraints on the pitch amplitude and/or rate may be defined based on rotor or generator speed. Note that the pitch rate and amplitude limits of a 2P pitch controller is typically defined relative to nominal speeds. When the ratio is close to, or equal to, one—indicating that the wind turbine 10 is operating at nominal speed (e.g. in a full-load operating region)—then the allowable pitch reference offset amplitude may be lower than when the ratio is significantly less than one, indicating that the wind turbine 10 is operating a lower rotor speed.

The gain-scheduled controller 306 may generate a first vector pointing in a first direction in the fixed coordinate frame. The direction of this vector may then be manipulated so that the 3P control components that are then output from the module 306 may form a second vector pointing in a second direction in the fixed frame, where the second vector may be determined to counteract the first vector. In some sense, the second vector may be regarded as being opposite to the first vector, such that the control signal is 'opposite' to what the wind turbine is doing, so as to mitigate the tower 3P content. These processing components are therefore aimed at addressing the excitations experienced by the wind turbine tower 102 as indicated in the 3P frequency content of the received signal.

Figure 6:
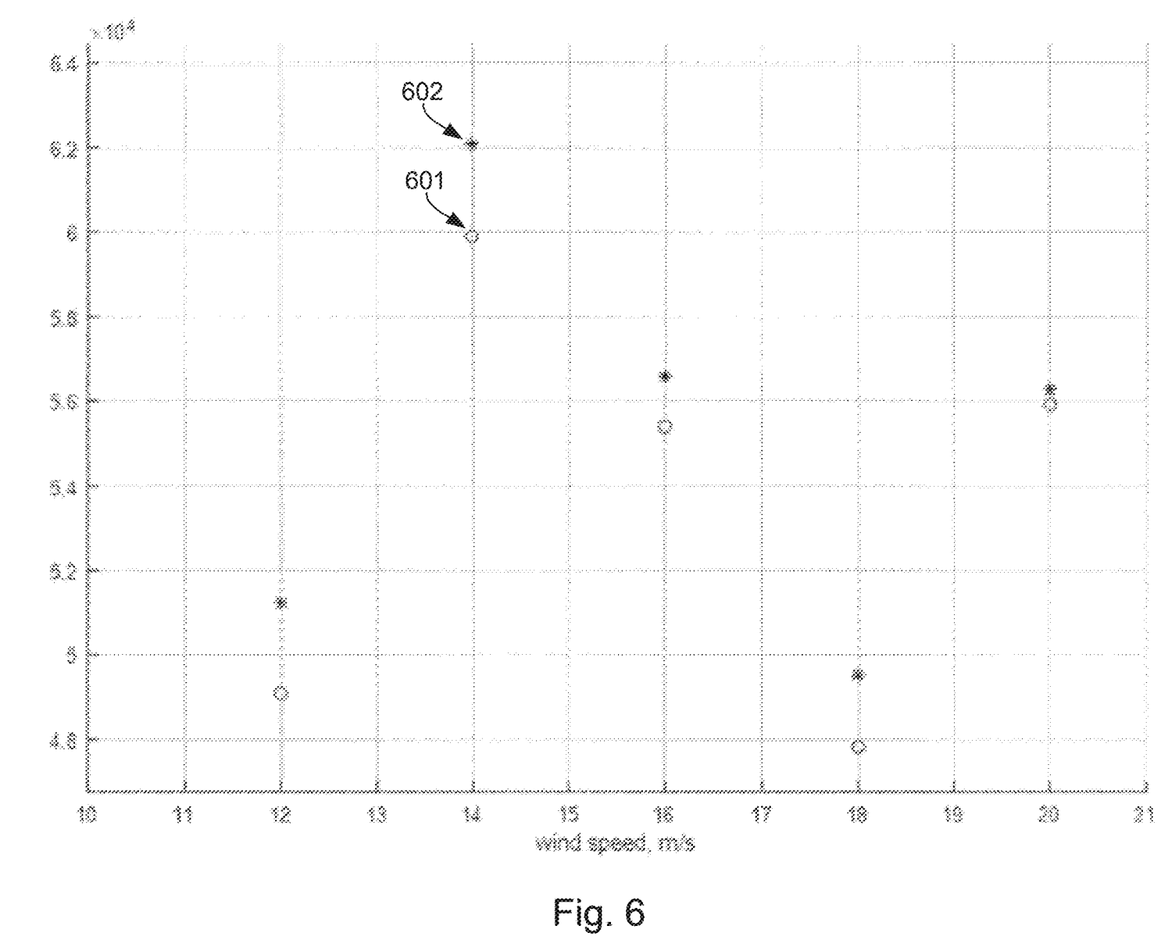
FIG. 6 shows a plot illustrating results obtained by implementing the controller of FIG. 2; and, FIG. 7 summarises the steps of a method performed by the controller of FIG. 2.

FIG. 6 is a plot illustrating simulation 1 Hz equivalent loads obtained by implementing the described control scheme for reducing fatigue in the wind turbine tower 102 caused by 3P frequency content. In particular, FIG. 6 shows a comparison of performance results when the described control scheme is used versus when the described control scheme is not used. Specifically, the circle data points 601 correspond to a case in which the described control scheme is used, and the asterisk/star data points 602 correspond to a case in which the described control scheme is not implemented. It may be seen that, overall, the tower experiences a lesser degree of excitation than when the control scheme is implemented compared to when it is not.

Figure 7:
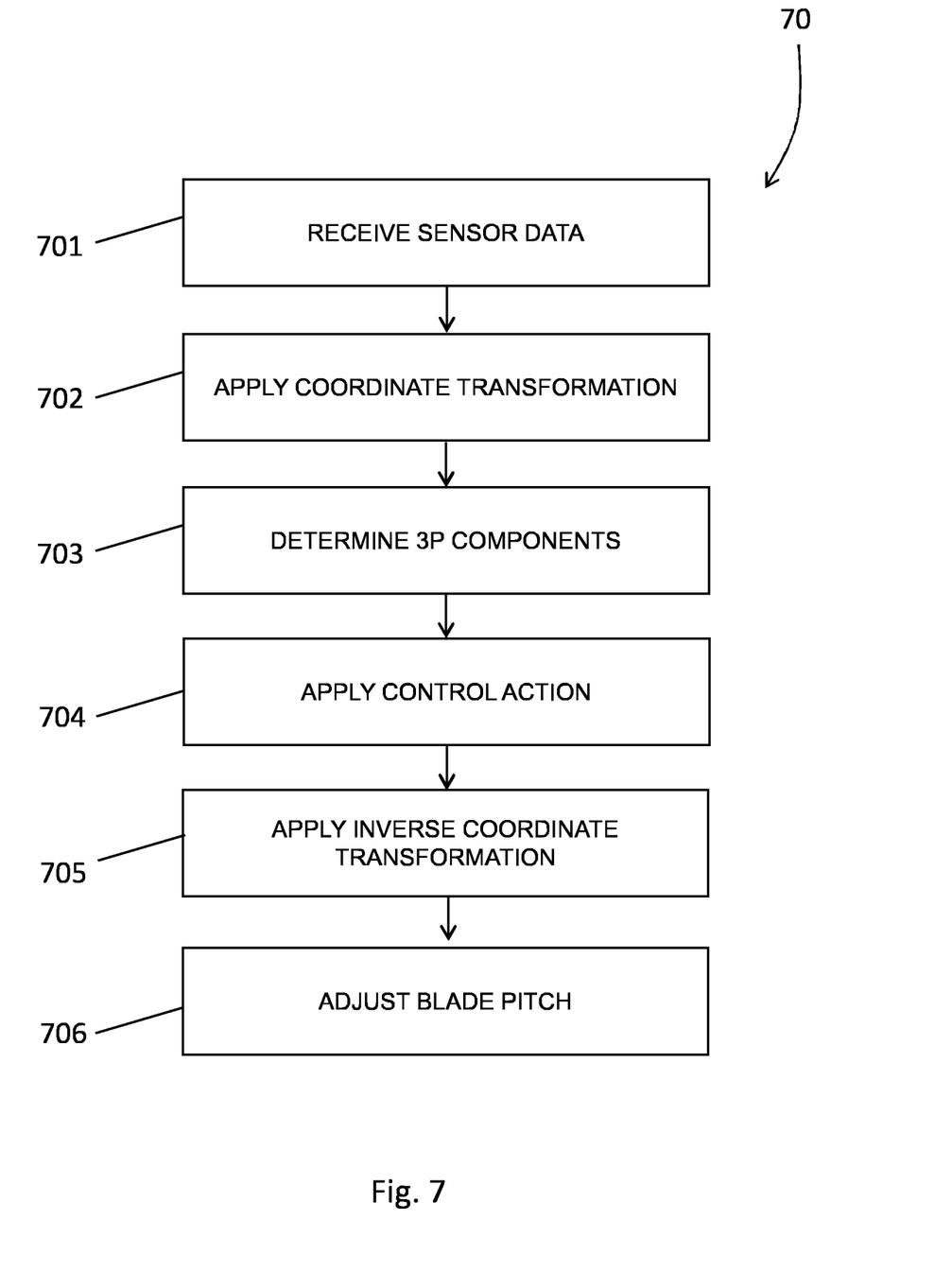

FIG. 7 summarises the steps of a method 70 performed by the controller 20 of the wind turbine 10. At step 701, the method 70 involves receiving sensor data indicative of flap loading on each of the respective rotor blades 106. The sensor data may be received from one or more flap loading sensors 112 of each of the three rotor blades 112. Alternatively, the flapwise loading on each blade 106 may be obtained or determined in any other suitable manner. The flapwise loading on each blade 106 is used to obtain a three-dimensional flap loading vector in a rotor coordinate frame of the wind turbine 10.

At step 702, the method 70 includes applying an m-blade coordinate transformation to the flap loading vector to obtain first and second mutually orthogonal components in a fixed coordinate frame of the wind turbine 10. The m-blade coordinate transformation may be a Coleman transformation. The first and second components may be in respective d and q directions of a d-q fixed reference frame. Obtaining the flap loading vector may include applying a filter to the flap loading data to remove content related to an imbalance in the wind turbine rotor 104. Alternatively, the flap loading vector may be formed based on the received flap loading data, and then modified to remove the rotor imbalance content.

At step 703, the method 70 includes determining first and second 3P components in the fixed coordinate frame based on the obtained first and second components. These 3P components are indicative of 3P frequency content of the wind turbine tower 102. The 3P components may be determined by applying a transform to the first and second components. The transform may be based on a phase of the 3P frequency content of the tower.

At step 704, the method 70 includes applying a control action to the 3P components to obtain respective 3P control components for mitigating the 3P frequency content of the tower 102. This may include application of a gain-scheduled control module to the 3P components. An activation gain for the control action may be determined based on a difference between the 3P frequency and a natural frequency mode, e.g. tower first mode. The activation gain may be such that the control action is applied only if the difference between the 3P and natural frequencies is small enough, e.g. only if the 3P frequency is within a prescribed amount of the natural frequency. The activation gain may vary depending on the precise difference between the 3P and natural frequencies. In a general sense, the activation gain may be greater when the difference between the 3P and natural frequencies is smaller. The activation gain may be modified in view of additional factors. For instance, an energy in the wind turbine tower 102 may be determined based on a tower acceleration signal, with the activation gain being modified based on the estimated energy.

An allowable maximum pitch reference offset in the gain-scheduled control module may vary depending on the operating point of the wind turbine 10. In particular, an allowable maximum pitch reference offset may be determined or set based on the rotation speed of the rotor 104 and, specifically, based on the rotor speed relative to a nominal rotor speed. In general, the allowable maximum pitch reference offset may be greater for lower values of the rotor speed relative to the nominal value. A greater allowable maximum pitch reference offset may be reflected by a greater pitch rate of blade pitch adjustment and/or more extreme values of blade pitch being realisable (i.e. greater amplitude levels).

At step 705, the method 70 involves applying an inverse m-blade coordinate transformation to the 3P control components (in the fixed reference frame) to obtain pitch reference offset values $\Delta\theta_1$, $\Delta\theta_2$, $\Delta\theta_3$ for the respective rotor blades 106 in the rotor coordinate frame, i.e. the output of the PAU 204 in FIG. 2. This inverse transformation may be in the form of an inverse Coleman transformation. At step 706, the method 70 involves transmit a control signal to adjust pitch of the rotor blades 106 based on the obtained pitch reference offset values $\Delta\theta_1$, $\Delta\theta_2$, $\Delta\theta_3$. For instance, the pitch reference offset values may be combined with a collective pitch reference $\theta_{col}$ from the speed control unit 202 as shown in FIG. 2 to obtain pitch modification signals $\Delta\theta_1$, $\Delta\theta_2$, $\Delta\theta_3$ that are used by a pitch actuation unit to adjust the pitch of the rotor blades 106.

Many modifications may be made to the described examples without departing from the scope of the appended claims.

The invention claimed is:

1. A controller for a wind turbine having three rotor blades, the controller being for adjusting pitch of the three rotor blades, the controller being configured to:
   receive sensor data, from a flap loading sensor of each of the three rotor blades, indicative of flap loading on each of the respective rotor blades, and obtain, based on the received sensor data, a flap loading vector in a rotor coordinate frame of the wind turbine;
   apply an m-blade coordinate transformation to the flap loading vector to obtain first and second mutually orthogonal components in a fixed coordinate frame of the wind turbine;
   determine first and second 3P components in the fixed coordinate frame based on the obtained first and second components, the first and second 3P components being indicative of 3P frequency content of a tower of the wind turbine;
   apply a control action to the first and second 3P components to obtain respective first and second 3P control components for mitigating the 3P frequency content of the tower;
   apply an inverse m-blade coordinate transformation to the first and second 3P control components to obtain pitch reference offset values for the respective rotor blades in the rotor coordinate frame; and
   transmit a control signal to adjust pitch of the rotor blades based on the obtained pitch reference offset values,
   wherein applying the control action comprises determining an activation gain that activates the control action when a ratio between a 3P frequency and a natural frequency of the tower is within a prescribed range, and wherein the activation gain is a constant value when the ratio between the 3P frequency and the natural frequency is within a prescribed sub-range of the prescribed range and the activation gain changes from the constant value to zero from an extreme value of the prescribed sub-range to an extreme value of the prescribed range.

2. The controller according to claim 1, wherein applying the control action comprises application of a gain-scheduled control module to the first and second 3P components.

3. The controller according to claim 2, wherein the controller is configured to obtain a current rotor speed of the wind turbine, and wherein an allowable maximum pitch reference offset is based on a comparison of the current rotor speed to a nominal rotor speed of the wind turbine.

4. The controller according to claim 3, wherein the allowable maximum pitch reference offset is greater for lower values of a ratio between the current rotor speed and the nominal rotor speed.

5. The controller according to claim 4, wherein the allowable maximum pitch reference offset is a first maximum pitch reference offset when the ratio is greater than a prescribed value, and the allowable maximum pitch reference offset is a second maximum pitch reference offset greater than the first maximum pitch reference offset when the ratio is less than the prescribed value.

6. The controller according to claim 3, wherein the allowable maximum pitch reference offset is indicative of at least one of:
a pitch rate at which pitch of the rotor blades is adjusted; and,
an amplitude limit to which pitch of the rotor blades is adjustable.

7. The controller according to claim 1, wherein determining the first and second 3P components comprises applying a transform to the first and second components based on a phase that moves at the 3P frequency.

8. The controller according to claim 1, wherein obtaining the flap loading vector comprises applying a first filter to the received sensor data to remove content in the received sensor data indicative of an imbalance in a rotor of the wind turbine.

9. The controller according to claim 1, wherein, prior to determining the first and second 3P components, the controller is configured to apply a second filter to remove content in the first and second components indicative of a steady-state contribution in a tilt or yaw direction of the wind turbine.

10. The controller according to claim 1, wherein the m-blade coordinate transformation is a Coleman transformation, and wherein the inverse m-blade coordinate transformation is an inverse Coleman transformation.

11. The controller according to claim 1, wherein the activation gain is zero if the ratio is not within the prescribed range.

12. The controller according to claim 1, wherein the activation gain changes from the constant value to zero from the extreme value of the prescribed sub-range to the extreme value of the prescribed range linearly.

13. The controller according to claim 1, wherein the controller is configured to:
obtain acceleration data indicative of an acceleration of the tower of the wind turbine; and
estimate an amplitude of tower accelerations based on the obtained acceleration data,
wherein the activation gain is determined based on the estimated amplitude of tower accelerations.

14. The controller according to claim 1, wherein the extreme value of the prescribed sub-range is a maximum extreme value and the prescribed sub-range also includes a minimum extreme value, the maximum extreme value and the minimum extreme value defining a span of the prescribed sub-range, and wherein the span straddles a value of the ratio equal to one.

15. The controller according to claim 14, wherein the extreme value of the prescribed range is a range maximum extreme value and the prescribed range also includes a range minimum extreme value, the range maximum extreme value and the range minimum extreme value defining a span of the prescribed range, and wherein the activation gain increases from zero to the constant value from the range minimum extreme value to the minimum extreme value, and the activation gain decreases from the constant value to zero from the maximum extreme value to the range maximum extreme value.

16. The controller according to claim 15, wherein the activation gain increases linearly from zero to the constant value from the range minimum extreme value to the minimum extreme value, and the activation gain decreases linearly from the constant value to zero from the maximum extreme value to the range maximum extreme value.

17. A wind turbine, comprising:
a tower;
a nacelle rotatably mounted to the tower;
a rotor supported by the nacelle and having pitch-adjustable rotor blades; and
a controller, configured to:
receive sensor data, from a flap loading sensor of each of the pitch-adjustable rotor blades, indicative of flap loading on each of the respective pitch-adjustable rotor blades, and obtain, based on the received sensor data, a flap loading vector in a rotor coordinate frame of the wind turbine;
apply an m-blade coordinate transformation to the flap loading vector to obtain first and second mutually orthogonal components in a fixed coordinate frame of the wind turbine;
determine first and second 3P components in the fixed coordinate frame based on the obtained first and second components, the first and second 3P components being indicative of 3P frequency content of the tower of the wind turbine;
apply a control action to the first and second 3P components to obtain respective first and second 3P control components for mitigating the 3P frequency content of the tower;
apply an inverse m-blade coordinate transformation to the first and second 3P control components to obtain pitch reference offset values for the respective pitch-adjustable rotor blades in the rotor coordinate frame; and
transmit a control signal to adjust pitch of the pitch-adjustable rotor blades based on the obtained pitch reference offset values,
wherein applying the control action comprises determining an activation gain that activates the control action when a ratio between a 3P frequency and a natural frequency of the tower is within a prescribed range, and wherein the activation gain is a constant value when the ratio between the 3P frequency and the natural frequency is within a prescribed sub-range of the prescribed range and the activation gain changes from the constant value to zero from an extreme value of the prescribed sub-range to an extreme value of the prescribed range.

18. The wind turbine of claim 17, wherein the extreme value of the prescribed sub-range is a maximum extreme value and the prescribed sub-range also includes a minimum extreme value, the maximum extreme value and the minimum extreme value defining a span of the prescribed sub-range, and wherein the span straddles a value of the ratio equal to one.

19. A method for adjusting rotor blade pitch of a wind turbine, the method comprising:
receiving sensor data, from a flap loading sensor of each of three rotor blades of the wind turbine, indicative of flap loading on each of the respective rotor blades, and obtaining, based on the received sensor data, a flap loading vector in a rotor coordinate frame of the wind turbine;
applying an m-blade coordinate transformation to the flap loading vector to obtain first and second mutually orthogonal components in a fixed coordinate frame of the wind turbine;
determining first and second 3P components in the fixed coordinate frame based on the obtained first and second components, the first and second 3P components being indicative of 3P frequency content of a tower of the wind turbine;

applying a control action to the first and second 3P components to obtain respective first and second 3P control components for mitigating the 3P frequency content of the tower;

applying an inverse m-blade coordinate transformation to the first and second 3P control components to obtain pitch reference offset values for the respective rotor blades in the rotor coordinate frame; and transmitting a control signal to adjust pitch of the rotor blades based on the obtained pitch reference offset values, and wherein applying the control action comprises determining an activation gain that activates the control action when a ratio between a 3P frequency and a natural frequency of the tower is within a prescribed range, and wherein the activation gain is a constant value when the ratio between the 3P frequency and the natural frequency is within a prescribed sub-range of the prescribed range and the activation gain changes from the constant value to zero from an extreme value of the prescribed sub-range to an extreme value of the prescribed range.

20. The method of claim 19, wherein the extreme value of the prescribed sub-range is a maximum extreme value and the prescribed sub-range also includes a minimum extreme value, the maximum extreme value and the minimum extreme value defining a span of the prescribed sub-range, and wherein the span straddles a value of the ratio equal to one.

* * * * *